United States Patent [19]

Thorud et al.

[11] E Patent Number: Re. 33,726

[45] Reissued Date of Patent: Oct. 29, 1991

[54] SINGLE STAGE SNOWTHROWER

[75] Inventors: Richard A. Thorud, Bloomington; Donald M. White, III, Chanhassen, both of Minn.

[73] Assignee: The Toro Company, Minneapolis, Minn.

[21] Appl. No.: 411,034

[22] Filed: Sep. 22, 1989

Related U.S. Patent Documents

Reissue of:

[64] Patent No.: 4,694,594
Issued: Sep. 22, 1987
Appl. No.: 775,288
Filed: Sep. 12, 1985

[51] Int. Cl.[5] ..... E01H 5/09

[52] U.S. Cl. ..... 37/244; 37/233

[58] Field of Search ..... 37/259, 244, 233, 257, 37/258, 251, 252, 209-213, 225, 240, 249, 254, 256, 260-262, 206; 198/638, 640-642, 657-665, 669-671, 676

[56] References Cited

U.S. PATENT DOCUMENTS

| | | |
|---|---|---|
| 2,642,680 | 6/1953 | Curtis et al. . |
| 2,687,830 | 8/1954 | Doering . |
| 2,735,199 | 2/1956 | Wanner et al. . |
| 2,768,453 | 10/1956 | Adams, Jr. . |
| 2,910,819 | 11/1959 | Helliwell . |
| 2,919,504 | 1/1960 | Rubin . |
| 3,065,555 | 11/1962 | Rubin . |
| 3,213,552 | 10/1965 | Vanvick . |
| 3,230,645 | 1/1966 | Lutz . |
| 3,236,568 | 2/1966 | Bombardier et al. . |
| 3,244,271 | 4/1966 | Wenning . |
| 3,359,661 | 12/1967 | Speiser et al. . |
| 3,363,345 | 1/1968 | Ober . |
| 3,452,460 | 7/1969 | Cope et al. . |
| 3,466,767 | 9/1969 | Rubin . |
| 3,468,041 | 9/1969 | Mattson et al. . |
| 3,484,963 | 12/1969 | Heth et al. . |
| 3,488,869 | 1/1970 | Heth et al. . |
| 3,548,522 | 12/1970 | Roper . |
| 3,603,008 | 9/1971 | Heth . |
| 3,805,421 | 4/1974 | Kamlukin et al. . |
| 3,908,540 | 9/1975 | Broman . |
| 4,068,397 | 1/1978 | Bacon . |
| 4,203,237 | 5/1980 | Enters et al. . |
| 4,322,896 | 4/1982 | Miyazawa . |
| 4,325,195 | 4/1982 | Comer . |
| 4,385,457 | 5/1983 | Fralish . |
| 4,477,989 | 10/1984 | Vachon . |
| 4,498,253 | 2/1985 | Schmidt . |

FOREIGN PATENT DOCUMENTS

| | | |
|---|---|---|
| 627518 | 9/1961 | Canada . |
| 2147001 | 4/1973 | Fed. Rep. of Germany . |
| 644096 | 8/1962 | Italy . |
| 197708 | 8/1977 | U.S.S.R. . |

OTHER PUBLICATIONS

Owner's Manual for Jacobsen Sno-Blitz (May 25, 1972).

Lawn-Boy Snow Thrower, advertisement (Aug. 1978).

Gilson Snow-Cannon, brochure (Jun. 1978).

Gilson—Nine Snow-Hungry Models, pp. 2-4 (Apr. 1979).

Jacobsen, Mowers, Riders & Tractors, Brochure 80--C-1 (Jan. 80).

*Primary Examiner*—Eugene H. Eickholt

*Attorney, Agent, or Firm*—James W. Miller

[57] ABSTRACT

An improved single stage snowthrower (2) includes an open front portion (14) having a rotatable impeller (30) contained therein. Impeller (30) contains at least one outwardly extending paddle (32) having a complex curved shape. Paddle (32) includes a central snow-throwing section (34) which is curved forwardly from its midpoint to each side thereof to be concave with this central section (34) extending over at least the middle 50 percent of the entire paddle's length. Two end sections (36) fill out the remaining length of paddle (32) and are shaped to function as augers for moving a relatively small volume of snow inwardly onto the central snow-throwing section (34). Improved impeller (30) can be used with an inverted funnel-shaped collecting chamber (22) located in the rear wall (18) of front portion (14) of snowthrower (2). Collecting chamber (22) is sized and shaped to approximate the size and shape of the inwardly tapered stream which is thrown off central section (34).

45 Claims, 6 Drawing Sheets

SINGLE STAGE SNOWTHROWER

Matter enclosed in heavy brackets [ ] appears in the original patent but forms no part of this reissue specification; matter printed in italics indicates the additions made by reissue.

Technical Field

This invention concerns a single stage snowthrower having a rotatable paddle-type impeller for picking up and throwing snow. More particularly, this invention relates to an improved impeller and an improved impeller/housing combination for such a snowthrower.

BACKGROUND OF THE INVENTION

Powered snowthrowers are well known and are generally either single stage or two stage. A typical single stage snowthrower is illustrated in U.S. Pat. No. 3,359,661 to Speiser. Such a snowthrower includes a housing which is generally open in front having spaced side walls connected by a rear wall that includes an arcuate lower portion. A snowthrowing impeller is rotatably journalled between the side walls to sit in front of the lower portion of the rear wall. The impeller includes two radially extending paddles, which are flexible for picking up and throwing snow. The upper portion of the rear wall of the housing includes a plurality of transversely spaced snow deflecting vanes. As the impeller rotates, the paddles pick up snow and carry the snow against the arcuate lower portion of the rear wall. When the paddles diverge from the arcuate lower portion at the tangent point where the upper portion of the rear wall begins, the forces acting on the snow cause it to be released from the paddles and to be thrown upwardly and outwardly generally along the upper portion of the rear wall. Depending upon the orientation of the vanes, the snow is thrown either forwardly or to the left or right.

The single stage snowthrower just described is so named because it utilizes only one powered implement, namely the impeller, for both picking up and throwing the snow outwardly away from the snowthrower. This may be contrasted with two stage snowthrowers which utilize two separate means for consecutively handling the snow. In any conventional two stage, such as the 521 snowthrower manufactured and sold by The Toro Company of Minneapolis, Minn., there is again a housing having an open front portion. However, a snow gathering auger, rather than a paddle-type impeller, is journalled in the front portion. The auger has generally opposed left and right helical flights which gather snow and feed it inwardly toward the center of the housing. There is an opening at the center of the rear wall which connects the auger to a chamber situated rearwardly thereof. This chamber includes a second powered element, namely a high speed rotatable fan, which takes the snow gathered by the auger and throws it vertically upwardly through a stack. The top of the stack includes a rotatable chute that can be rotated by a gear and handle arrangement to face toward the front or to the left and right respectively.

Both types of snowthrowers have their own particular advantages and disadvantages. Single stage snowthrowers are generally lighter and less expensive than two stage snowthrowers, but they generally do not throw snow as far or control the direction of the thrown snow as well as do two stage snowthrowers. While two stage snowthrowers have the ability to direct the snow to a precise location, because of the rotatable chute on top of the stack, they lose some efficiency because of the different directions in which the snow is moved. The snow is first "chopped up" and moved inwardly by the auger, then moved rearwardly into the fan chamber, then thrown upwardly through the stack, and finally directed to the left, right or forwardly depending upon the direction of the chute. Snow can more easily clog in such a tortuous path. Moreover, the need for two separate snow contacting and moving elements, namely the auger and the fan, adds to the cost and complexity of the two stage.

There have been attempts in recent years to have what might be called a mid-model snowthrower or a cross between a single stage and a two stage. In such a snowthrower, as illustrated in U.S. Pat. No. 4,322,896 to Miyazawa, only a single, rotatable impeller is used which includes, however, opposed auger flights that feed snow to a central section that rotates on the same shaft as the auger flights. This central section, which is simply a flat and relatively short paddle, takes the inwardly moving snow from the augers and throws it up vertically through a stack and chute arrangement somewhat similar to that found in two stages. Such a snowthrower allegedly gives one the advantages of a two stage, more precise directional control for example, without sacrificing the advantages of a single stage, namely only one active snow throwing element.

While the above noted snowthrower has attempted to successfully combine both single stage and two stage technology, it exhibits some disadvantages. For one thing, Applicants have discovered that the auger sections often overfeed snow to the impeller section. In other words, at a normal forward walking speed for the operator of the snowthrower, the auger sections deliver snow to the impeller section generally faster than the impeller section can remove it from the housing by throwing it up the stack. This can contribute to clogging of the impeller section with snow which obviously is undesirable. Moreover, the relatively extended length of the auger sections and the high rotational speed thereof allow such sections to radially throw an appreciable amount of snow upwardly rather than augering it inwardly. Accordingly, even when the impeller section does not clog, a conconsiderable amount of snow is recirculated instead of being clearly thrown by this snowthrower. The physical manifestation of this is snow spit or dribbling which extends out forwardly from the auger sections of the impeller and which detracts from the aesthetic appearance of the snowthrower during operation and may also lessen how fast the snowthrower can be pushed forwardly.

SUMMARY OF THE INVENTION

The present invention provides an improved single stage snowthrower similar to the mid-model snowthrower noted above by having only a single rotatable snowthrowing impeller. The improvement relates to the impeller which has at least one outwardly extending paddle for picking up and throwing snow. The paddle includes a central snowthrowing section which extends over at least the middle one-half of the entire length of the paddle. The central section is curved forwardly from the mid-point to each side thereof to be generally concave. The paddle also includes two end sections on each side of the central section which fill out the remaining length of the paddle. Each end section comprises a relatively small portion of one turn of a helical auger having a relatively small pitch in relation to the paddle's length.

Another aspect of this invention is an impeller having a central snowthrowing section which throws snow upwardly away from the snowthrower housing. Two end sections are located on each side of the central section to fill out the remaining length of the paddle. Each end section comprises an auger means for feeding snow inwardly onto the central section. The central and end sections are proportioned relative to one another such that for any unit volume of snow contacted by the snowthrower the volume of snow augered inwardly by the end sections is less than the volume of snow thrown upwardly by the central section, whereby overfeeding of the central section by the end section is minimized.

Yet another aspect of this invention is an impeller having a concave shaped central section in combination with an improved snow collecting chamber on the housing. The rear wall of the open front of the housing includes an inverted, funnel shaped collecting chamber having a lower edge generally adjacent the tangent point of the rear wall to the paddle. The inward taper of the collecting chamber is shaped to match the inwardly tapered stream in which snow is thrown from the curved central section of the impeller.

Finally, another important feature of this invention is to construct an impeller of the above noted shape from a flexible material. In such a case, the impeller will include support means for maintaining this flexible material in the necessary curved shape. The paddle can be made from a relatively soft rubber material, to have better wear characteristics, and will still have the rigidity necessary for throwing snow because of its bent shape.

BRIEF DESCRIPTION OF THE DRAWINGS

This invention will be described in more detail hereafter, when taken in conjunction with the following drawings, in which like reference numerals refer to like elements throughout.

DETAILED DESCRIPTION

Figure 1:
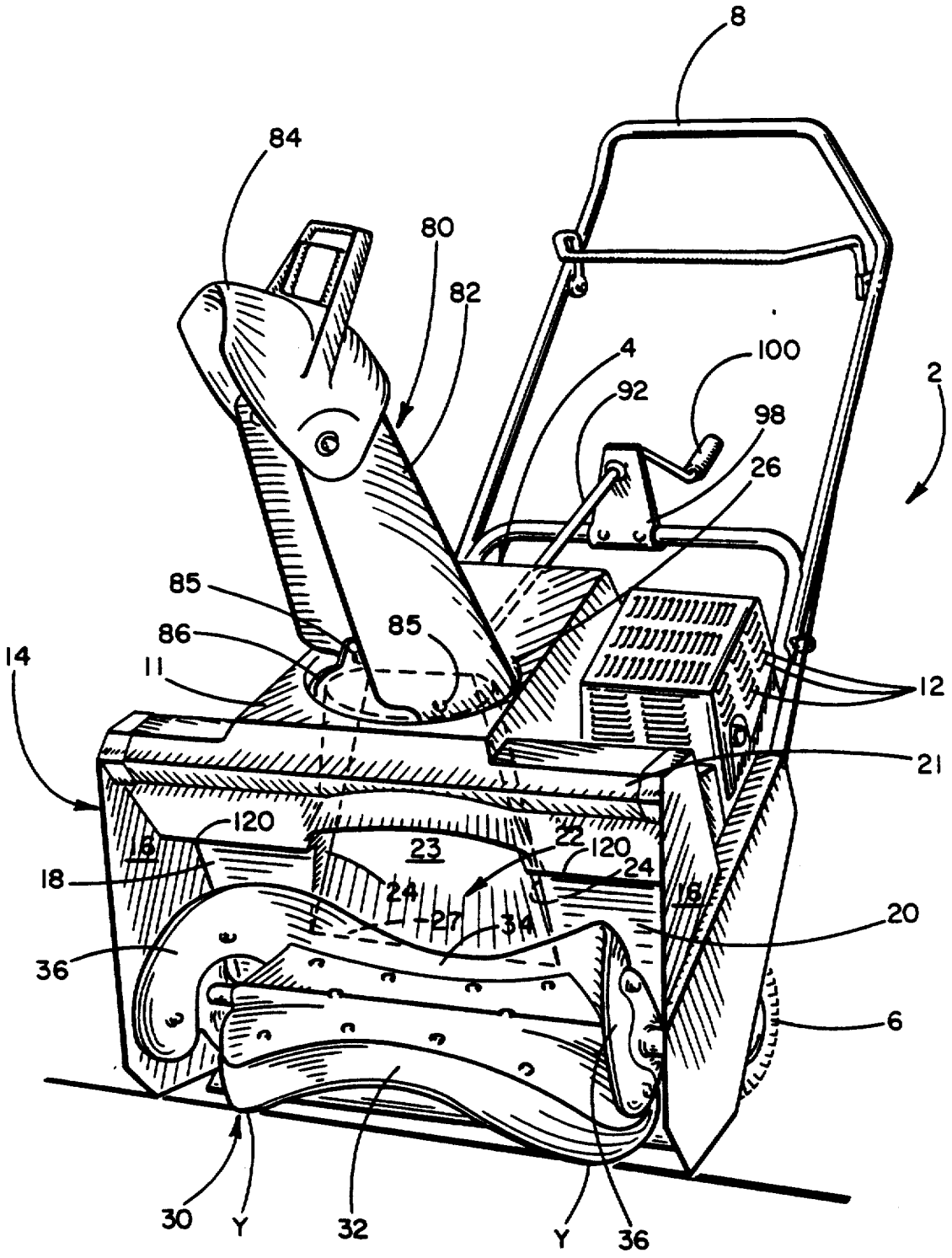
FIG. 1 is a perspective view of an improved snowthrower according to this invention, particularly illustrating the improved impeller having an outwardly extending paddle comprising a concave central section surrounded by two auger shaped end sections.

Referring first to FIG. 1, an improved snowthrower according to this invention is generally shown as 2. Snowthrower 2 is similar to existing single stage snowthrowers, such as the Toro S-200 or S-620, in that it utilizes a single powered snowthrowing impeller 30. In addition, snowthrower 2 is similar to existing two stage snowthrowers, such as the Toro 521, in that it utilizes a rotatable directional chute 80 for precisely controlling the direction of the thrown snow. One major improvement in snowthrower 2 is the use of an improved snowthrowing impeller 30 which allows a single stage snowthrower to approximate the performance of much larger two stage snowthrowers.

Figure 4:
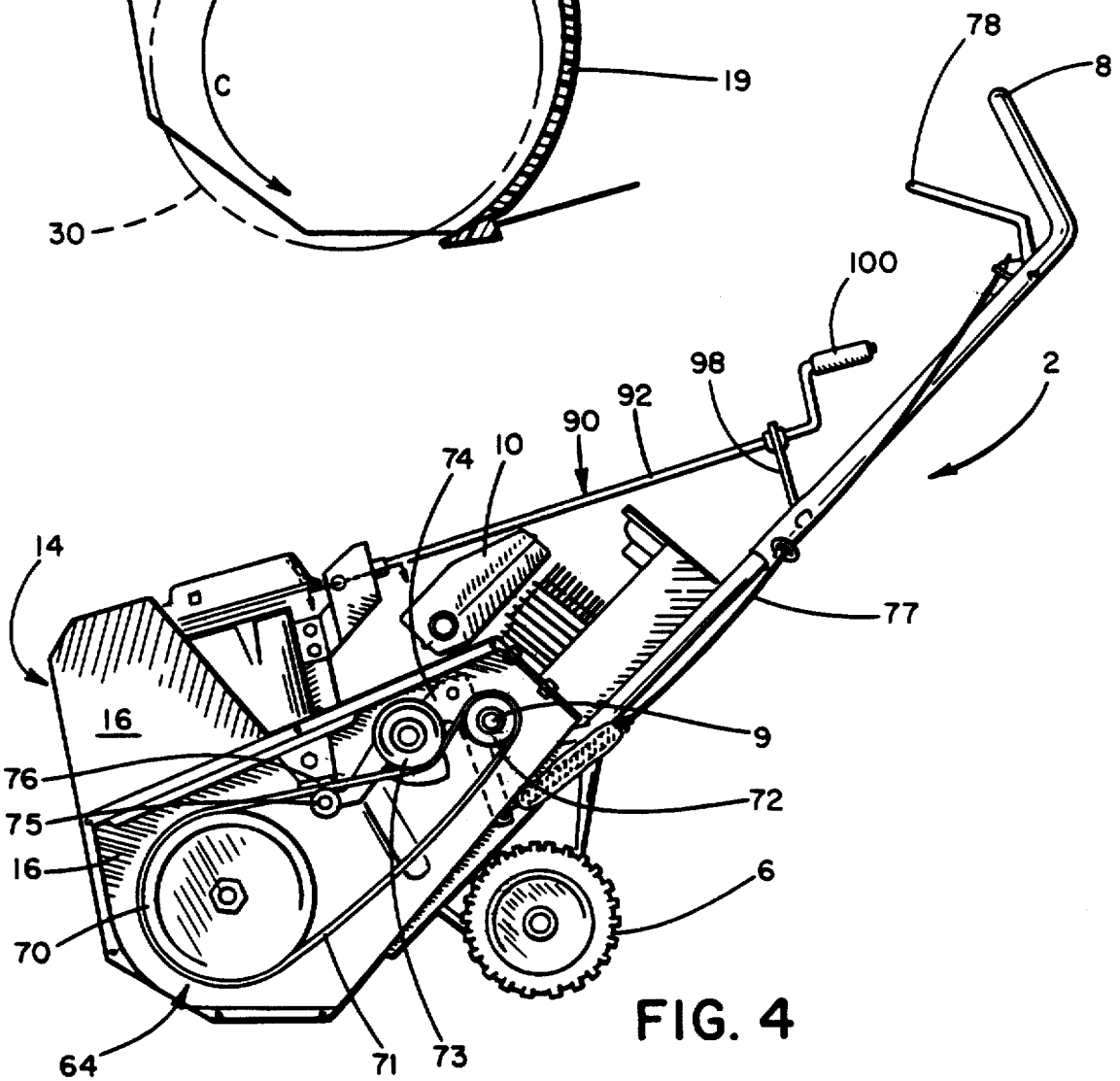
FIG. 4 is a side elevational view of the snowthrower shown in FIG. 1, particularly illustrating a drive transmission for powering the impeller.

Snowthrower 2 includes a housing 4 supported for rolling along the ground by two, spaced apart wheels 6, only one of which is shown in FIGS. 1 and 4. A U-shaped, upwardly extending handle assembly 8 is secured to the back of housing 4 and terminates at a height above the ground which is convenient for being gripped by an operator. Handle assembly 8 allows the operator to maneuver snowthrower 2 and to push it forwardly, along with any self-propelling action exhibited by impeller 30. An internal combustion engine 10, or any other suitable power source, is contained inside housing 4 for powering impeller 30. See FIG. 4 which shows engine 10 after a removable top cover 11 that normally encloses engine 10 has been removed for the purpose of illustration. Various rows of air vents 12 are placed into cover 11 for allowing combustion and cooling air to reach engine 10. The precise type of engine, the manner in which it is supported inside housing 4, and the specific components thereof, such as the carburetor, muffler and the like, are not important to the present invention and may be of any suitable type. Similarly, that portion of housing 4 which encloses engine 10, including cover 11, may be of any suitable design.

Figure 2:
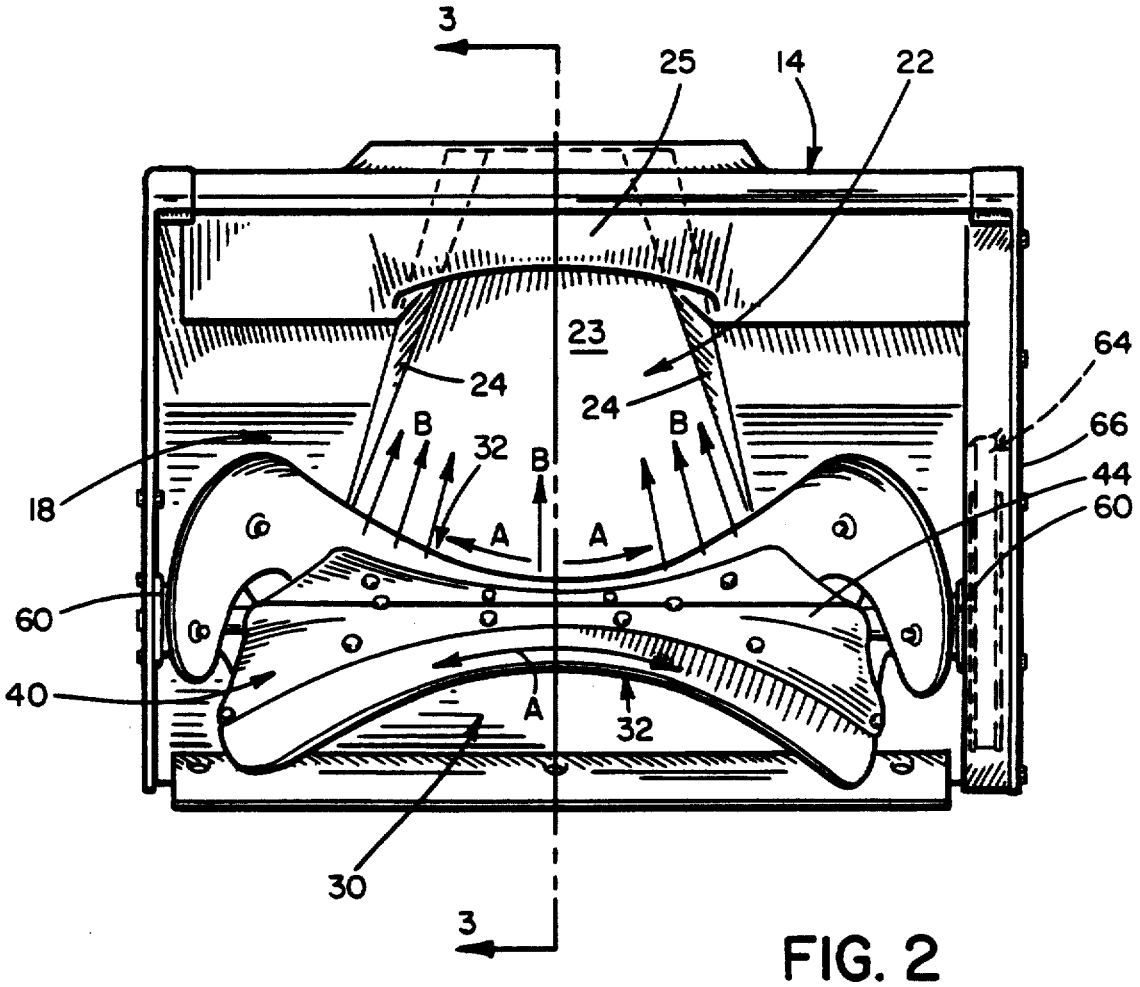
FIG. 2. is a front elevational view of a portion of the snowthrower shown in FIG. 1, particularly illustrating the improved impeller and inverted, funnel-shaped collecting chamber on the snowthrower housing.
Figure 3:
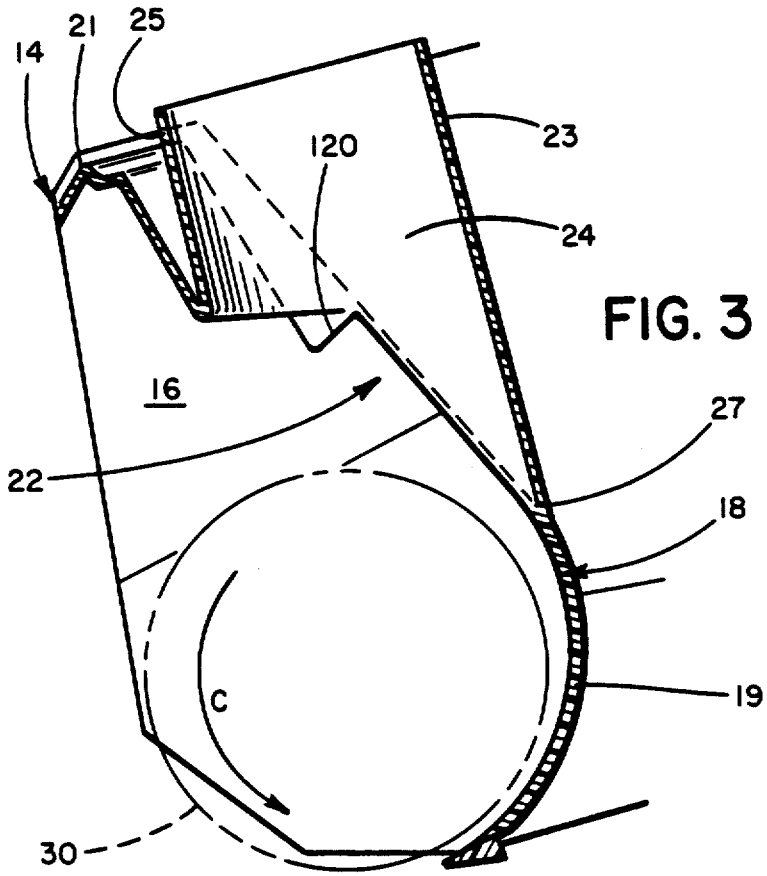
FIG. 3. is a cross sectional view of the snowthrower housing taken along lines 3-3 in FIG. 2, particularly illustrating the funnel-shaped collecting chamber shown in FIG. 2.

Referring now to FIGS. 1-3, housing 4 includes an open front portion 14 in which impeller 30 is housed for contacting the snow. Front portion 14 includes two side walls 16 and a rear wall 18. Rear wall 18 includes a lower arcuate portion 19 which is semi-cylindrical in shape and an upper portion 20 integrally connected to lower portion 19. Upper portion 20 extends upwardly and forwardly, preferably along a tangent line to the cylinder described by rotation of impeller 30, until it terminates in an upper edge 21 that generally defines the top of the front portion 14 of housing 4.

One important feature of front portion 14 of housing 4, especially in combination with the improved impeller 30, is an inverted, funnel-shaped collecting chamber 22 located at the middle of the upper portion 20 of rear wall 18, through which the snow picked up by impeller 30 is thrown upwardly. Collecting chamber 22 is defined by a rear wall 23, two triangular side walls 24 that progressively increase in width as chamber 22 rises vertically, and a generally circular upper collar or ring 25 into which the side and rear walls 23 and 24 are connected or blended. See FIGS. 2 and 3. Collar 25 defines the upper end of collecting chamber 22 and lies within an opening 26 in the top cover 11 of housing 4 immediately to the rear of the upper edge 21 of front portion 14. As shown in FIG. 2, chamber 22 is wider at the bottom than at the top to taper inwardly as it rises. Moreover, at least over the lower portion of its length, i.e., the portion below collar 25, chamber 22 is open in front, not becoming enclosed until one reaches collar 25. Another important feature of collecting chamber 22 is that its lower edge 27 lies generally adjacent the junction between the lower and upper portions 19 and 20 of rear wall 18, i.e., at the tangent line between rear wall 18 and impeller 30. The purpose of collecting chamber 22 will be described in more detail hereafter.

Turning now to the construction of improved impeller 30, impeller 30 comprises a particularly effective means for gathering and throwing snow in a single stage snowthrower 2. Impeller 30 comprises two outwardly extending paddles 32, preferably identical in shape, which are offset 180° from each other around the circumference of impeller 30. Each paddle 32 includes a relatively long, central snowthrowing section 34 surrounded on either side by a relatively short, end section 36 that functions as an auger. Central section 34 is generally concave in shape between each side thereof, i.e., it curves forwardly in the direction of rotation of impeller 30 from the midpoint to each side as shown in FIG. 2 by the arrows A. Thus, as one proceeds outwardly from the midpoint to each side of central section 34, snow will be thrown off the face of central section 34 at gradually increasing inwardly directed angles. This is represented by the vector arrows B in FIG. 2 which represent the resultant force on a snow particle at that point on the face of central section 34. The result of this configuration is that snow during steady state operation of impeller 30 is thrown upwardly in what appears as an inwardly tapering stream, i.e., a stream which decreases in width as it rises upwardly.

Figure 8:
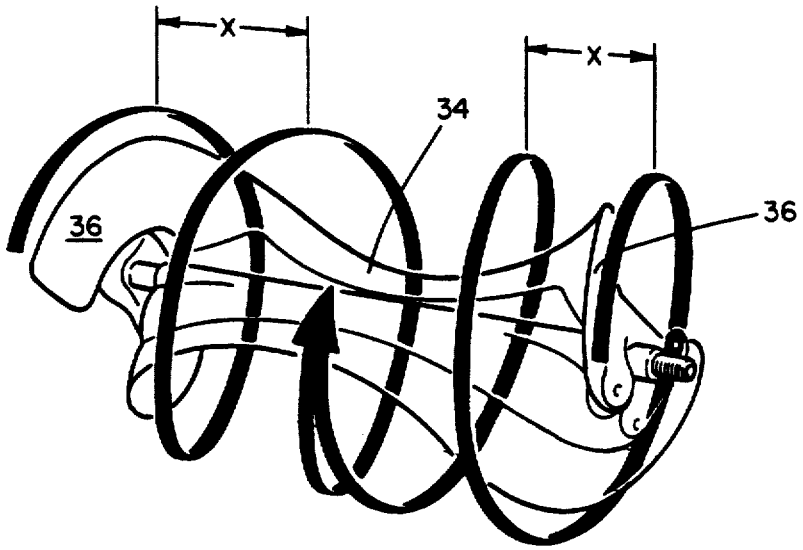
FIG. 8 is a perspective view of the impeller shown in FIG. 1, particularly illustrating the helical shape that the augers defined by the end sections would have taken had they been allowed to continue around the circumference of the impeller.

As noted, each paddle 32 includes two end sections 36 whose primary function is not to throw snow upwardly in the manner of central section 34, but to take that snow which lies outwardly of central section 34 and feed it inwardly onto central section 34. In keeping with this, each end section 36 comprises a "dog eared" portion that extends forwardly from each side of central section 34 and which appears to slant slightly inwardly when viewed from directly above on edge. In fact, each end section 36 comprises a relatively small portion of one complete turn of an inwardly directed helical or spiral auger having a relatively small pitch in relation to the length of paddle 32. FIG. 8 is an illustration of the shape this auger would have taken had it continued around the circumference of impeller 30 with X referring to the auger's pitch, i.e., the distance between adjacent flights, which as illustrated is considerably less than the paddle's length. However, each end section 36 does not so continue around, but is integrally joined to the adjacent side of central section 34 so that it smoothly feeds snow onto the central section.

While each end section 36 has been described as being relatively distinct from central section 34, the axially inwardmost portion of each end section 36 might be considered a transition section in which the shape of the end section is blended to match the shape of the central section 34 at the side thereof. However, if such a transition section does in fact exist, it will be considered as part of the end section for the purposes of definition herein.

One important feature of the impeller 30 is the proportioning of the various paddle sections relative to one another. Applicants have found that a particularly effective impeller is created when the concave central section 34 extends over at least the middle 50% of the impeller's total length and preferably up to the middle 75 percent or so of the impeller's length. In such a case, end sections 36 will fill out the remaining portion of the paddle's length on either side of central section 34. In addition, both the central and end sections 34 and 36 are generally equal in circumferential extent. For example, paddle 32 shown in FIG. 1, extends over approximately 180° of the circumference of impeller 30, with central section 34 extending roughly 90°, i.e., from 0° to 90° of the impeller's circumference, and end sections 36 then extending the remaining 90°, i.e., from approximately 90° to 180°. However, the use of two 180° extending paddles 32 as illustrated herein is not critical to the inventon. For example, three such paddles could be used in which each paddle would only extend over 120°. In such a case, the central and end sections 34 and 36 of paddle 32 would be downsized so that each would extend over an approximately 60° circumferential extent.

Figure 7:
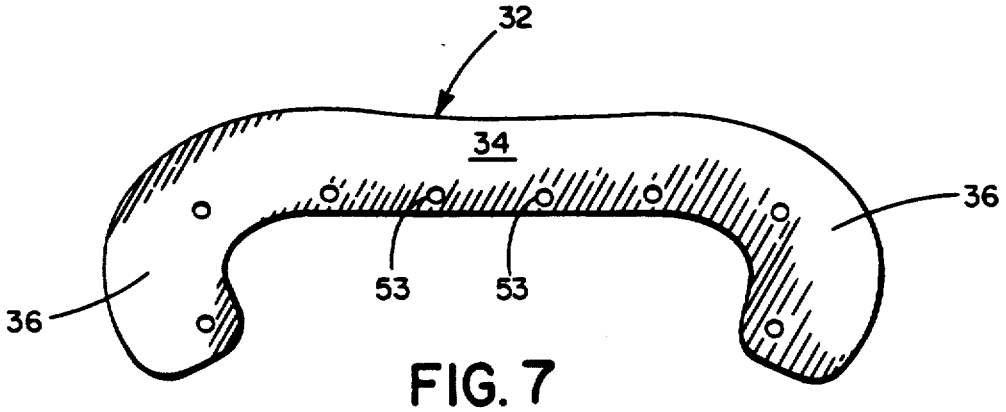
FIG. 7 is a top plan view of a performed paddle before it is bent and assembled into the shape of the impeller shown in FIG. 1.

Each paddle 32 is preferably made from a single piece of flexible material, such as a fiber reinforced rubber, which may be stamped or cut out of a large piece of stock or molded so as to be provided in a preformed piece as illustrated in FIG. 7. Each such preformed paddle 32 is then bent into the shape illustrated in the drawings and described herein and maintained in that shape on a central through shaft 38 that comprises part of impeller 30 by using two distinct metal stampings 40 and 42. The first stamping 40 is a generally concave stamping which helps define the generally concave shape of central section 34 and so will be referred to herein as the central stamping. The second stamping 42 will be referred to as the end stamping as it likewise helps to define the auger like end sections 36 of paddle 32.

Figure 5:
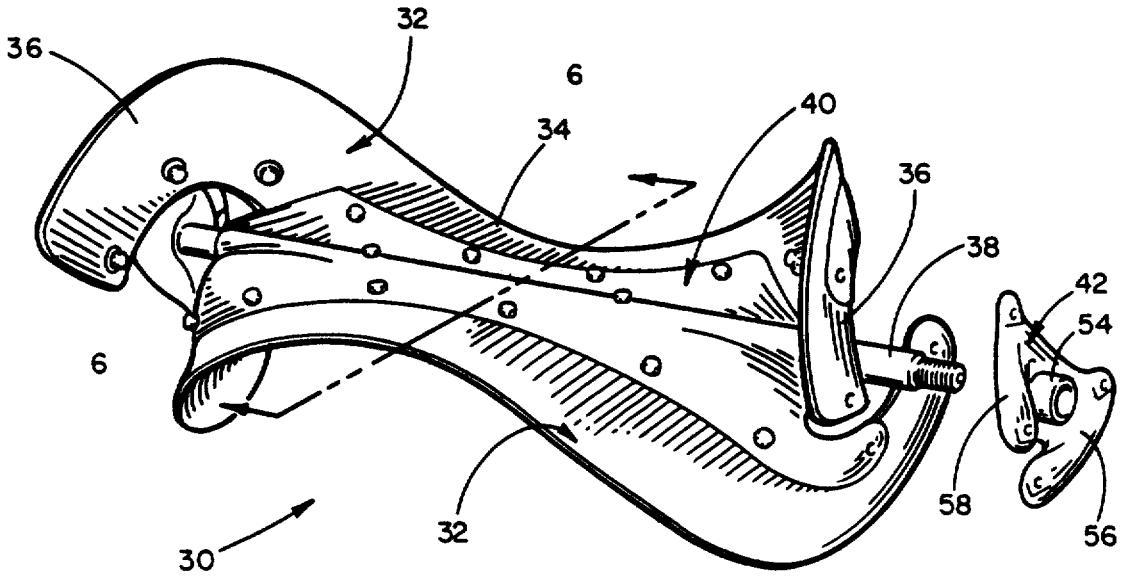
FIG. 5 is a partially exploded perspective view of the improved impeller of the snowthrower shown in FIG. 1, particularly illustrating the method of construction thereof.
Figure 6:
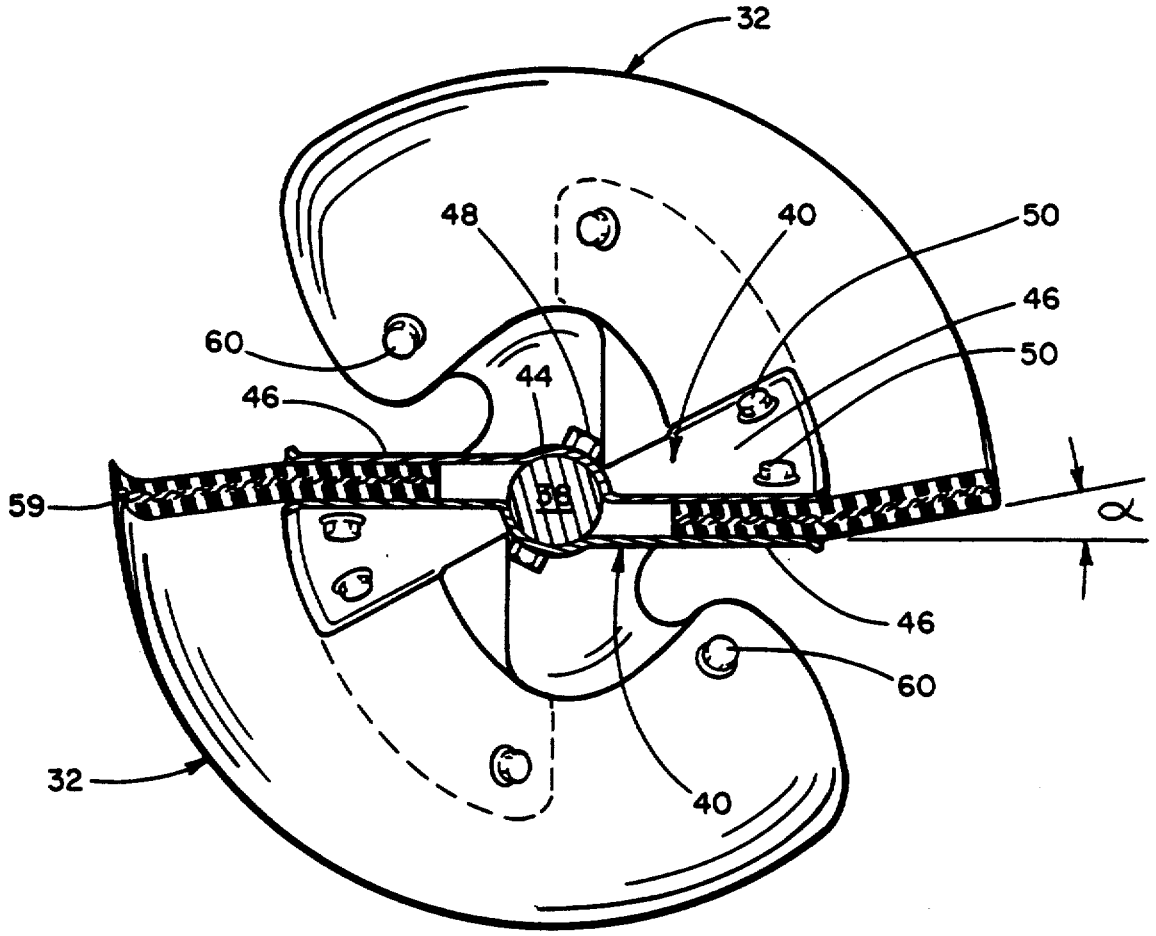
FIG. 6 is a cross-sectional view of the impeller shown in FIG. 5, taken along lines 6—6 in FIG. 5, particularly illustrating one paddle in a new condition and one paddle in a relatively worn condition.

Central stamping 40 comprises a semi-circular hub portion 44 having two generally radially extending faces or flanges 46 on either side thereof, flanges 46 being concavely curved to define the concave shape of central section 34. Referring to FIGS. 2, 5 and 6, two identical central stampings 40 are used with their hub portions 44 being mated to opposed sides of shaft 38 and secured thereto by connecting bolts 48. Central stampings 40 will be installed so that the flanges 46 which project to a given side of shaft 38 will have matching concave shapes and a small gap will be provided between the opposed flanges 46. The material which comprises paddle 32 can then be inserted into this gap and the paddle secured thereto by threaded fastners, such as bolts 50, which pass through aligned openings in the flanges 46 and various holes 53 placed in the preformed rubber paddle 32. When paddle 32 is restrained in this fashion, the flexible material of which it is made will naturally be bent into the concave shape required. Referring to FIG. 2, and with respect to the length of central section 34 as defined by central stampings 40, Applicants have discovered that a paddle yielding acceptable results will be achieved when the length of the hub portions 44 of stampings 40 is approximately 14 inches for a paddle 32 having an approximately 18 inch overall length. In this particular case, central section 34 as thus defined extends over approximately the middle 75 percent of the length of paddle 32.

Despite the use of central stampings 40, end sections 36 of paddle 32 would otherwise be free to move, thus requiring the use of end stampings 42 for securing them. As shown particularly in FIG. 5, each end stamping includes a circular hub 54 having two generally radially extending ears 56 and 58. Each of the ears is slanted at an oblique angle relative to the axis of hub 54 to define the inwardly slanted orientation of end section 36 as it functions as an auger. Each end section 36 is secured with threaded fasteners 60 to the adjacent ear 56 or 58 on the end stampings 42. The use of metal stampings 40 and 42 for securing the flexible rubber material of paddle 32 into its necessary shape is both an economical way of manufacturing impeller 30 and also allows the paddles to be easily replaced if need be.

Preferably, each paddle 32 is provided in a particular preformed shape so that central section 34 will have a slightly forward facing angle when it is assembled between stampings 40, i.e., central section 34 is tilted forwardly in the direction of rotation of impeller 30 with respect to a radial line extending out from the axis of rotation. See the illustration of $\alpha$ in FIG. 6 which designates the forward facing angle. The amount of forward facing at the midpoint of central section 34 is preferably from 5° to 20° and then gradually decreases as one moves from the midpoint around to each side of central section 34 where the forward facing has been decreased to approximately 0°. This helps blend central section 34 into end section 36 which preferably lie along a radial line. While a slight forward facing on central section 34 has been described herein, it may be dispensed with completely with central section 34 lying merely along a straight radial line. This can be done simply by slightly adjusting the shape of the preformed rubber paddle before it is assembled into stampings 40 so that it will not be deformed out of a purely radial line as it is bent into its concave shape. If the forward facing on central section 34 is dispensed with, impeller 30 still exhibits a better performance than prior art impellers, through its performance does not appear to be quite as good as an impeller 30 will the small amount of forward facing noted above.

Finally, Applicants have discovered that the choice of materials for paddle 32 is important and when made properly yields a paddle having much better wear characteristics. Because paddle 32 has a concave shape over the central snowthrowing section 34, a much softer rubber material can be used in paddle 32 which will, however, become stiff enough to not bend backwardly while throwing snow because of the rigidity imparted to it by the very act of bending it into the concave shape. Rubber material for some prior art snowthrower paddles, such as those used in the Toro S-620, will generally be harder to resist bending under the snow load and have a hardness measured by a durometer rating of 75 to 85 on the Shore A scale. Applicants have discovered that a rubber material in the range of 55 to 65 on the Shore A scale yields a satisfactory paddle 32 according to this invention because of the extra rigidity imparted to it by its curved shape. Moreover, Applicants have discovered that it is also preferred to use one or more layers 59 of a fabric reinforcing material inside the rubber material with the fabric having a tensile strength sufficiently great to prevent the rubber material from stretching. One acceptable material for paddle 32 is a piece of rubber conveyor being manufactured by Uniroyal and known as Uniroyal U.S. Flex C 175 which includes one centered polyester fabric layer covered by two equal thickness layers of SBR rubber.

Referring now to FIGS. 1 and 2, impeller 30 is horizontally situated within the front portion 14 of housing 4 in front of rear wall 18 and has its through shaft 38 rotatably journalled in side walls 16 thereof using any suitable bearings or bushings 60. One end of shaft 38 extends through one of the side walls 16 and into a drive transmission chamber 64 located immediately outside that side wall or formed as part of the side wall. Chamber 64 is normally enclosed by a removable side cover 66 to prevent snow and other debris from fouling a drive transmission 68 contained within chamber 64. Transmission 68 selectively couples impeller 30 to drive shaft 9 of engine 10.

Referring to FIG. 4 which illustrates chamber 64 with side cover 66 removed, transmission 68 comprises a driven pulley 70 mounted on the end of through shaft 38 and a drive belt 71, preferably a poly V belt, journalled around driven pulley 70. Drive belt 71 also extends around a drive pulley 72 located on drive shaft 9 of engine 10. An idler pulley 73 is used to selectively tension drive belt 71 to transfer driving power from engine 10 to impeller 30. Idler pulley 73 is mounted at the middle of one of the arms of a bellcrank lever 74 with a brake roller 75 being mounted at the end of the same arm. Brake roller 75 cooperates with a fixed brake pad 76 to quickly stop the rotation of impeller 30 when transmission 68 is disengaged. The other arm of the bellcrank lever 74 is connected by a suitable linkage 77 to a control handle or bail 78 located at the top of handle assembly 8. Spring tensioning forms a part of linkage 77 so that the control bail 78 normally assumes the position shown in FIG. 4. In this position, bellcrank lever 74 has been rotated until brake roller 75 engages brake pad 76 and idler pulley 73 is positioned so that there is slack in drive belt 71.

When it is desired to begin operation of impeller 30, the operator need only place his hands on control bail 78 and squeeze it shut against the upper end of handle assembly 8. This action will be transmitted through linkage 77 and will rotate bellcrank lever 74 in such a direction that brake roller 75 disengages brake pad 76 and idler pulley 73 is moved downwardly in a direction which tensions drive belt 71. This transmits power from engine 10 to impeller 30 and the impeller will begin rotation. When bail 78 is released, the spring tensioning will reset the elements to the positions shown in FIG. 4 with brake roller and brake pad engagement causing a rapid stopping of impeller 30.

While one particular type of transmission 68 has been shown herein, any other suitable type of transmission for selectively transmitting power from engine 10 to impeller 30 could be used. For example, instead of the fixed brake pad 76 cooperating with brake roller 75, a pivotal brake arm (not shown) could be used in approximately the same position. When bellcrank lever 74 is pivoted into its drive disengaged position such that brake roller 75 has been pushed up against the underside of drive belt 71, the brake arm would also be pivoted to bring a small brake pad down into engagement with drive belt 71 on top of driven pulley 70. This would provide an even more efficient braking mechanism than that specifically illustrated herein if such a mechanism were desired.

Figure 9:
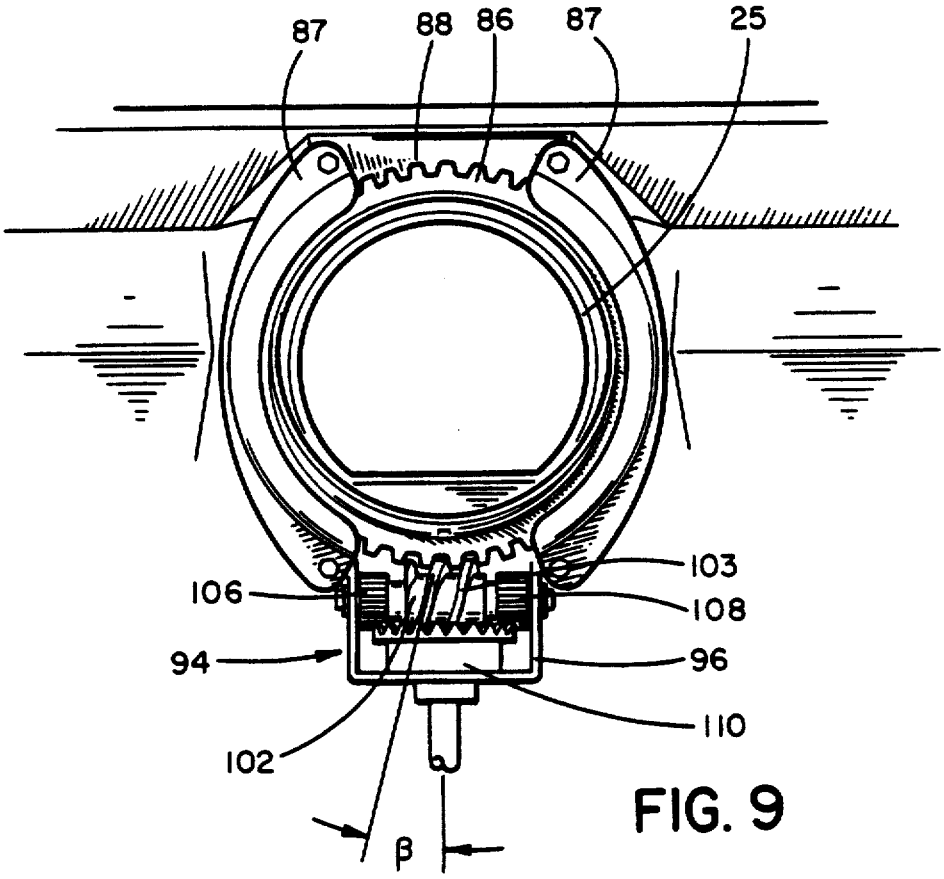
FIG. 9 is a top plan view of a portion of the snowthrower shown in FIG. 1, particularly illustrating a improved crank mechanism used for rotating the snow directing chute around a substantially vertical axis.

Referring now to FIGS. 1 and 9, the circular ring 25 which defines the upper end of snow collecting chamber 22 closely fits inside the open lower end of a rotatable chute 80. Chute 80 is of a generally conventional design and includes an upwardly extending, U-shaped discharge trough 82 having a pivotal hood 84 at the top thereof. Trough 82 is fixedly connected by bolts 85 or the like to a drive gear ring 86 located generally within opening 26 in cover 11. Drive gear ring 86 is rotatably constrained in housing 4 by semi-circular flanges 87 which overlie drive gear ring 86 and prevent it from being pulled upwardly out of its rotatable support structure in housing 4. See FIG. 9. The periphery of drive gear ring 86 includes a set of straight gear teeth 88 for engagement with an improved crank mechanism or means 90 for rotating drive gear ring 86 and hence chute 80.

Figure 10:
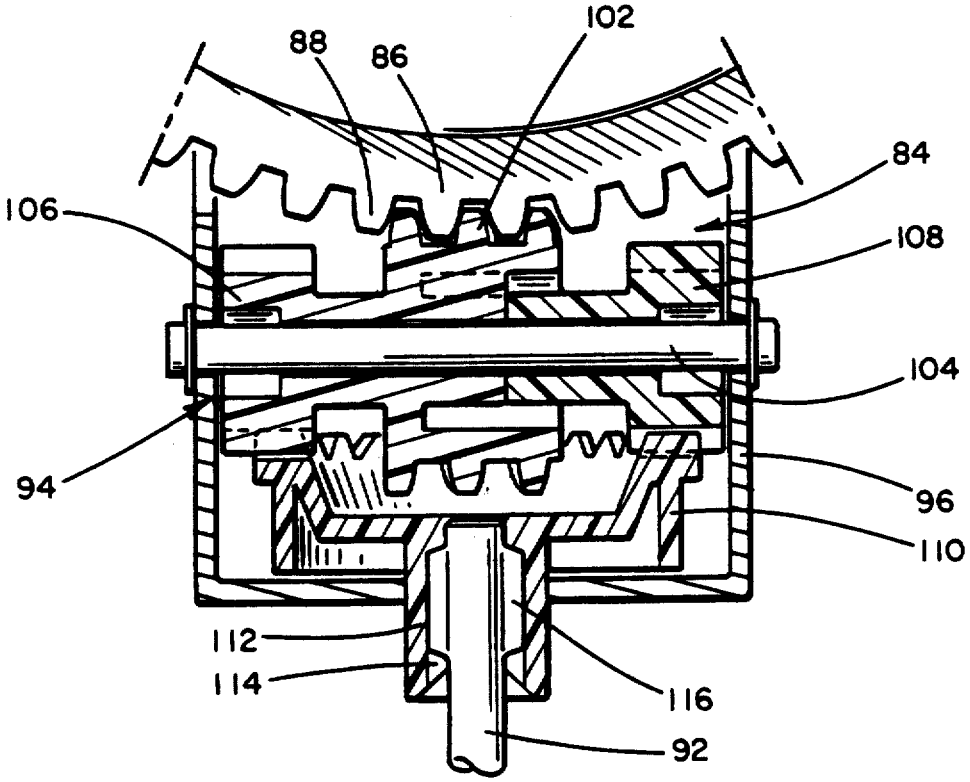
FIG. 10 is an enlarged cross-sectional view of the gear train used in the crank mechanism shown in FIG. 9.

Referring now particularly to FIGS. 4, 9, and 10, crank means 90 includes a longitudinally extending crank handle 92 having a front end connected to a gear train 94 contained in a U-shaped housing 96 located immediately in back of drive gear ring 86. The rear end of crank handle 92 is rotatably supported in a bracket 98 located on a cross piece of handle assembly 8 at the middle thereof. See FIG. 1. The outer end of crank handle 92 terminates in grip 100 which the operator, when standing behind handle assembly 8, can reach and rotate in either direction using either hand. This is true because crank handle 92 runs straight back from chute 80 to the middle of handle assembly 8, and not to one side or the other as is typical in most prior art snowthrowers. Accordingly, an operator who is either right or left handed can easily reach and operate crank handle 92.

Turning now to FIGS. 9 and 10, gear train 94 includes a worm 102 which is rotatably mounted on a horizontal cross shaft 104 and is arranged to have the helical teeth 103 thereof engaged with teeth 88 of drive gear ring 86. An important feature of worm 102 is that teeth 103 have a relatively shallow lead angle of approximately 12°, the lead angle referring to the angle which teeth 103 form relative to a line at right angles to the axis of rotation of worm 102 as indicated by the angle $\beta$ in FIG. 9. Intermediate drive gear 106 is located on the same cross shaft 104 as worm 102 and is integrally formed with worm 102 to one side thereof. A spacer gear 108, similar to drive gear 106 in shape, is loosely journalled on shaft 104 on the other side of worm 102. Drive gear 106 and spacer gear 108 are both coupled to a face gear 110 with spacer gear 108 preventing face gear 110 from cocking during operation. Face gear 110 has a central circular hub 112 which extends through the rear wall of housing 96. Hub 112 includes a recess 114 for receiving therein the front end of crank handle 92 which includes a flattened key portion 116 for nonrotatably securing crank handle 92 within recess 114. A spring (not shown) is preferably connected to crank handle 92 to bear against some part of snowthrower 2, such as bracket 98, in a direction which firmly biases crank handle 92 into engagement with gear train 94. One important feature of gear train 94 is that the gear ratios are chosen to provide at least a two to one speed increases from face gear 110 to worm 102. The operation of gear train 94 will be described hereafter.

Turning now to the operation of snowthrower 2, any suitable means, such as a pull rope or an electric starter, may be provided for starting engine 10. With the operator standing behind handle assembly 8, operation of impeller 30 can begin at any time simply by closing bail 78 against the upper end of handle assembly 8. This transfers power from engine 10 to impeller 30 to rotate impeller 30 as shown by the direction of the arrows C in FIG. 3. The operator can then use rotation of impeller 30 to help move snowthrower 2 along the ground. This is done by slightly tipping snowthrower 2 forwardly to bring rubber paddles 32 into engagement with the ground. Because of the complex curved shape of each paddle 32, one or more points on at least one paddle 32 are always in engagement with the ground which serves to help propel snowthrower 2 along. For example, referring to FIG. 1, the ground can be illustrated as a line which in the particular position of impeller 30 shown therein is being contacted by the lowermost paddle 32 at the two points of contact labeled Y. As the rotation of impeller 30 continues in the direction of arrows C, contact points Y will move closer to one another until the lowermost paddle 32 is contacting the ground only at the very midpoint of the curved central snowthrowing section 34. However, before this midpoint departs from its engagement with the ground, the outermost end sections 36 of the upper paddle 32 have already contacted the ground, so that a continuous self-propelling action is exhibited by impeller 30, rather than the slapping type self-propelling action exhibited by snowthrowers having straight paddles. When or if a self-propelling action is not desired, the operator only needs to let snowthrower 2 rest back on its wheels 6 in which case paddles 32 will be out of engagement with the ground.

As impeller 30 rotates, the first parts of each paddle 32 which contact any given unit volume of snow immediately in front of impeller 30 are the outer end sections 36 of paddle 32. These sections tend to bite into the snow and move the relatively small volume of snow lying outboard of central section 34 inwardly toward central section 34. As the rotation continues and paddle 32 bites deeper into the snow, the central section 34 then begins to engage not only the snow moving inwardly from end section 36, but also the other and major volume of snow immediately in front of the central sections 34 which end section 36 cannot reach. Central section 34 then scoops up all of this snow and carries it rearwardly against the arcuate lower portion 19 of rear wall 18. This lower portion 19 confines the snow on paddle 32 until the tangent point between the rear wall and paddle 32 is reached, i.e., the point at which paddle 32 is adjacent the lower edge 27 of collecting chamber 22. At this point, the snow on paddle 32 is thrown upwardly directly into the collecting chamber 22 with collecting chamber 22 having been shaped to aproximate nicely the size and shape of the inwardly tapered snow stream as it leaves the central section of paddle 32, i.e., a stream which decreases in width as it rises vertically. The snow is thrown upwardly through collecting chamber 22 and the circular ring 25 which defines the top thereof into rotatable chute 80. The snow can then be thrown in various different directions depending upon how chute 80 has been turned.

Impeller 30 and the combination of impeller 30 and snow collecting chamber 22 have numerous advantages as follows:

1. The shape of impeller 30 along with the shape and placement of collecting chamber 22 yield a single stage snowthrower 2 having performance characteristics which begin to approach the performance of much larger two-stage snowthrowers. In this regard, Applicants believe that the shape of central snowthrowing section 30, including its slight amount of forward facing, is more efficient than prior art straight paddle impellers in collecting and throwing snow, i.e., the snow appears to be firmly cupped and held by central section 34 until it is released into chamber 22 with less spillage of snow on the paddle. Moveover, impeller 30 according to this invention scoops and removes the snow in a snow path which by and large does not have a great number of turns or changes in direction. In addition, collecting chamber 22 is sized and shaped to coincide with the size and shape of the snow stream from central section 34 and begins at the tangent point where impeller 30 releases the snow. This configuration of impeller 30 and chamber 22 thus removes the snow with a minimum of disturbance and without providing sharp and inefficient changes in direction or surfaces on which the snow can get hung up. In addition, collecting chamber 22 is open in front up to the level of circular ring 25 such that collecting chamber 22 will not plug even with wet and heavy snow. All these factors are believed to have contributed in varying degrees to a snowthrower which exhibits substantial performance improvements over more conventional single-stage snowthrowers 2. Impeller 30 has also had the various sections thereof proportioned in such way so that the snow is handled with very little forward spit or dribbling. Unlike many snowthrowers of the prior art which have relatively long auger sections in relation to a short central impeller. Applicants have discovered that the impeller should be shaped exactly the reverse, i.e., having a relatively long central section 34 with short end sections 36 that function as augers. This relationship has been described in two ways earlier in this application, namely by describing the physical parameters for the length of central snowthrowing section 34 in relation to end sections 36 and also by noting that central snowthrowing section 34 engages and removes a larger volume of snow than the combined volumes of snow moving inwardly from end section 36. Accordingly, such an impeller 30 does not overfeed snow from the end sections 36 to central section 34, i.e. central section 34 can handle and remove all the snow it receives from the end sections 37 with a minimum of snow being recirculated. Accordingly, the aesthetic appearance of snowthrower 2 in operation, which may be very important to some purchasers, is improved with much less forward snow spit or dribbling coming from snowthrower 2. Whatever snow does escape upwardly from the end sections 36 before feeding onto the central section 34 is quickly knocked down by two downwardly directed ledges or kickers 120 located on the upper portion 20 of rear wall 18 on either side of snow collecting chamber 22.

3. The use of a flexible material bent into and maintained in the shape of paddle 32 appears to contribute to a number of advantages. For one thing, when snowthrower 2 is tipped forwardly and paddles 32 are able to engage the ground a continuous self-propelling action is exhibited by the snowthrower. In addition, the rubber material which paddles 32 are made can be picked from a relatively softer rubber material since they will become more rigid by the very act of bending them into shape. When these paddles wear, they appear to extrude a small lip off the rear thereof as shown in one of the paddles illustrated in FIG. 6. Applicants have discovered that paddles 32 shaped as illustrated and described herein appear to maintain their ability to throw snow at longer hours of operation than more conventionally shaped flat, radial paddles. It is believed this is due to the use of a flexible material having the concave shape for central section 34 which acts as a rigid cup in scooping and throwing the snow such that its ability to do so does not degrade as much even when the clearance between the central section 34 and the arcuate lower portion 19 of rear wall 18 increases. In addition, it is believed that the use of a softer rubber material in paddles 32 also contributes to this long life. While the presence of the lip at the rear of paddles 32 which is extruded during wear might maintain the clearance between the tip of paddle 32 and the arcuate lower portion 19 of rear wall 18 at a more constant value, it is believed that this would be relatively minor in contributing to the ability of paddles 32 to throw snow more effectively at longer hours of operation, at least minor compared to the presumed major factors of the shape itself along with the use of a softer rubber material.

Accoringly, impeller 30 according to this invention yields many advantages as noted above. Various modifications to this invention would be apparent to those skilled in the art. For example, while impeller 30 is most effectively used with an inverted funnel-shaped collecting chamber 22 of the type shown, it would not necessarily have to be used in conjunction with such a collecting chamber 22 for snowthrower 2 to have improved performance characteristics. For example, it could be used on even existing single stage snowthrowers such as the Toro S-200 or S-620 by mounting impeller 30 in place of the currently existing impeller. Even with such a substitution, the improved construction of snowthrower of impeller 30 appears to yield improved results in terms of the height of the thrown snow, the cohesiveness of the snow stream, less forward snow spit or dribbling and improved performance at higher hours of operation of the paddle.

In addition, the specific crank means 90 disclosed in this application for rotating chute 80 would also appear to have definite and distinct advantages over similar prior art arrangements. These advantages relate primarily to the fact the gear train 94 provides a means for speeding up rotation of chute 80 in relation to how many turns is required on crank handle 92, all with a gear train 94 that is not susceptible to reverse rotation due to the snow load on chute 80. In this invention, the lead angle $\beta$ on worm 102 is sufficiently small so that it approximates a self-locking arrangement, i.e., one where a torque force on the drive gear ring 86 is not able to cause reverse rotation of worm 102 because the lead angle will not allow this. However, to compensate for the tendency of such a worm 102 to rotate drive gear ring 86 slowly, Applicants have utilized the speed increasing face gear 110, which effects at least a two-to-one speed increase from crank handle 92 to worm 102. Moreover, the entire arrangement has now been designed to come off directly to the rear from rotatable chute 80 so that grip 100 on crank handle 92 is situated at the midpoint of handle assembly 8. This allows ambidextrous operation in an easy fashion and does not require the operator to reach to one side or the other of snowthrower 2 to operate crank handle 92. All these improved characteristics can be found in the crank means 90 and can be used in a snowthrower 2 of any design as long as that snowthrower utilizes a rotatable chute arrangement 80 of the type shown herein.

There are other modifications which will be apparent to those skilled in the art. Accordingly, the scope of this invention will be limited only by the appended claims.

We claim:

1. An improved single stage snowthrower of the type having a housing that includes a generally open front portion defined by spaced side walls connected together by a rear wall; a rotatable snowthrowing impeller extending between the side walls and located in front of the rear wall; and engine means carried by the housing for rotating the impeller: and wherein the improvement comprises:

an impeller having at least one outwardly extending paddle for picking up and throwing snow, wherein the paddle comprises:

(a) a central snowthrowing section which extends over at least the middle one-half of the entire paddle's length, wherein the central section is curved forwardly from the midpoint to each side thereof to be generally concave such that snow is thrown in a stream that tapers inwardly as it rises from the central section;

(b) two end sections located on each side of the central section which fill out the remaining length of the paddle, wherein each end section comprises a relatively small portion of one turn of a helical auger having a relatively small pitch in relation to the paddle's length; and (c) wherein the central snowthrowing section faces forwardly with respect to a radial line extending from the axis of rotation of the central section, wherein the amount of the forward facing is from 5° to 20° at the midpoint of the central section and is approximately 0° at each side of the central section.

2. An improved single stage snowthrower as recited in claim 1, wherein each end section has its axially inwardmost portion blended into a configuration which approximates the shape of the central section along each side thereof so that snow can move smoothly from the end section onto the central section from which it is thrown.

3. An improved single stage snowthrower as recited in claim 2, wherein the end and central sections of the paddle are integrally connected together.

4. An improved single stage snowthrower as recited in claim 3, wherein the paddle is made from a single piece of material.

5. An improved single stage snowthrower as recited in claim 1, wherein the paddle is made from a single piece of flexible material, and wherein the impeller further comprises:

(a) a substantially horizontal drive shaft rotatably journalled in the side walls of the front portion of the housing; and (b) means for securing the paddle to the drive shaft such that the various sections thereof are bent into and maintained in the corresponding shapes thereof.

6. An improved single stage snowthrower as recited in claim 1, wherein the central snowthrowing section is made from a flexible rubber material, and wherein the rubber material has a hardness between 55 and 65 as measured on the Shore A scale.

7. An improved single stage snowthrower as recited in claim 6, wherein the rubber material includes at least one fabric reinforcement layer therein.

8. An improved single stage snowthrower of the type having a housing that includes a generally open front portion defined by spaced side walls connected together by a rear wall; a rotatable snowthrowing impeller extending between the side walls and located in front of the rear wall; and engine means carried by the housing for rotating the impeller; and wherein the improvement comprises:

a) an impeller having at least one outwardly extending paddle for picking up and throwing snow, wherein the paddle comprises a wide central snowthrowing section which is curved forwardly from the midpoint to each side thereof to be generally concave such that snow is thrown in a stream that tapers inwardly as it rises from the central section, wherein the central snowthrowing section extends over at least approximately one-half of the entire impeller's predetermined length; and b) a funnel-shaped snow collecting chamber located on the rear wall of the housing generally behind the impeller which chamber is inverted to taper inwardly from side-to-side as it rises and is wide at its lower end to receive snow from the wide central snowthrowing section of the paddle.

9. An improved single stage snowthrower as recited in claim 8, wherein the inward taper of the chamber is sized and shaped to generally approximate the size and shape of the inwardly tapered snow stream thrown from the central section of the paddle.

10. An improved single stage snowthrower as recited in claim 8, wherein the lower end of the collecting chamber is generally adjaent the point at which the rear wall is tangent to the paddle with the chamber extending upwardly away therefrom.

11. An improved single stage snowthrower as recited in claim 10, wherein the collecting chamber has an upper end formed as a ring having upper and lower edges, wherein the upper edge of the ring is located adjacent a snow directing chute rotatably carried on the housing.

12. An improved single stage snowthrower as recited in claim 11, wherein the collecting chamber is open in front up to the level of the lower edge of the ring.

13. An improved single stage snowthrower as recited in claim 8, wherein the paddle further includes two end sections located on each side of the central section which fill out the remaining length of the paddle, and wherein each end section comprises an auger means for feeding snow inwardly onto the central section.

14. An improved single stage snowthrower as recited in claim 13, further including downwardly directed ledges located on the rear wall on each side of the funnel-shaped snow collecting chamber positioned to intercept and direct downwardly any snow which is inadvertently thrown upwardly by the end sections of the paddle.

15. An improved single stage snowthrower as recited in claim 8, wherein the central snowthrowing section extends over approximately the middle seventy-five percent of the entire impeller's predetermined length.

16. An improved single stage snowthrower of the tupe having a housing that includes a generally open front portion defined by spaced side walls connected together by a rear wall; a rotatable snowthrowing impeller extending between the side walls and located in front of the rear wall; and engine means carried by the housing for rotating the impeller; and wherein the improvement comprises:

an impeller including:

(a) at least one outwardly extending paddle for picking up and throwing snow, wherein the paddle is made from flexible material and comprises:

(i) a central snowthrowing section which extends over at least the middle one-half of the entire paddle's length, wherein the central section is curved forwardly from the midpoint to each side thereof to be generally concave; and (ii) two end sections located on each side of the central section which fill out the remaining length of the paddle, wherein each end section comprises a portion of a helical auger for feeding snow inwardly onto the central section;

(b) a substantially horizontal drive shaft rotatably journalled in the side walls of the front portion of the housing; and (c) means for securing the paddle to the drive shaft such that the various sections thereof are bent into and maintained in the corresponding shapes thereof, wherein the securing means comprises:

(i) a first means for connecting the central section to the drive shaft such that the central section has a closed, planar face between the drive shaft and a distal end thereof; and (ii) a second means for connecting the end sections to the drive shaft such that the end sections include a gap between the drive shaft and distal ends thereof.

17. An improved single stage snowthrower as recited in claim 16, wherein the first means includes a pair of first securing members each having a [semicircular] *semicircular* hub secured to the drive shaft and further including two radially outwardly extending flanges which are concavely curved to define the shape of the central section, and wherein the second means comprises a pair of second securing members each located at one end of the drive shaft and each having a circular hub received around the drive shaft and two radially extending ear portions which are inclined at an oblique angle relative to the drive shaft to define the orientation of the end sections.

18. An improved single stage snowthrower, which comprises:

(a) a housing which includes a generally open front portion defined by spaced side walls connected together by a rear wall;

(b) a rotatable snowthrowing impeller extending between the side walls and located in front of the rear wall and having a predetermined length between the side walls, wherein the impeller includes at least one outwardly extending paddle for picking up and throwing snow, and wherein the paddle includes a snowthrowing section which extends over at least approximately one-half of the entire impeller's predetermined length, wherein the snowthrowing section is curved forwardly from the midpoint to each side thereof to be generally concave in the direction of rotation of the impeller; and (c) a snow collecting chamber located on the rear wall of the housing, wherein the chamber tapers inwardly from side-to-side as it rises, and wherein the chamber at its lower end is sufficiently wide to span at least approximately fifty percent, but less than one hundred percent, of the entire impeller's predetermined length.

19. An improved single stage snowthrower as recited in claim 18, wherein the snow collecting chamber is located on the rear wall of the housing generally behind the snowthrowing section of the paddle.

20. An improved single stage snowthrower, which comprises:

(a) a housing which is movable over the ground;

(b) rotatable impeller means carried on the housing for throwing snow upwardly relative to the housing, wherein the impeller means includes means for throwing a snow stream which tapers inwardly as it rises away therefrom, wherein the throwing means comprises a paddle portion which extends generally radially relative to the impeller means and extends over at least approximately one-half of the impeller means' total length; and (c) means on the housing for defining a generally upwardly extending discharge path for the snow stream which path has upper and lower ends, wherein the lower end of the discharge path comprises a generally open faced trough located proximate to and in back of the snow stream as the snow stream is thrown from the impeller, and wherein the trough is tapered inwardly from side-to-side to conform generally in size and shape to the inwardly tapered snow stream as it leaves the impeller means.

21. An improved single stage snowthrower as recited in claim 20, wherein the upper end of the discharge path includes selectively rotatable means for directing the snow stream away from the housing in different directions.

22. An improved single stage snowthrower, which comprises:

(a) a movable housing having spaced side walls;

(b) a rotatable snowthrowing impeller carried on the housing and having a predetermined length between the side walls, wherein the impeller has at least one outwardly extending paddle for picking up and throwing snow upwardly relative to the housing, wherein the paddle has a wide snowthrowing section which extends over at least approximately one-half of the entire impeller's predetermined length, and wherein the snowthrowing section is curved forwardly from the midpoint to each side thereof to be generally concave in the direction of rotation of the impeller, whereby snow is thrown in a stream from the snowthrowing section of the paddle; and (c) means on the housing for defining a generally upwardly extending discharge path for the snow stream which path has upper and lower ends, wherein the lower end of the discharge path comprises a trough located proximate to and in back of the snow stream as the snow stream is thrown from the paddle, and wherein the trough is wide at its bottom to receive snow from the wide snowthrowing section of the paddle and is tapered inwardly from side-to-side as it progresses from the bottom toward the top thereof to help concentrate the width of the snow stream as the snow stream rises from the paddle.

23. An improved single stage snowthrower as recited in claim 22, wherein the upper end of the discharge path includes selectively rotatable means for directing the snow stream away from the housing in different directions.

24. An improved single stage snowthrower, which comprises:

(a) a housing having a front portion which engages the snow and which includes a rear wall and spaced side walls, wherein the rear wall comprises an arcuate lower portion and an upper portion that extends upwardly relative to the lower portion;

(b) a rotatable impeller located on the housing in front of the rear wall thereof and having a predetermined length between the side walls wherein the rotation of the impeller describes a cylinder that is bounded along the rear thereof by the arcuate lower portion of the rear wall and by at least a lower section of the upper portion of the rear wall, wherein the impeller includes an outwardly extending paddle having a curved central snowthrowing section for throwing upwardly away therefrom at approximately the juncture between the lower and upper portions of the rear wall a snow stream which has a width as it departs the snowthrowing section of at least approximately one-half the impeller's predetermined length and in which axially outermost portions of the snow stream have a component of motion that is directed axially inwardly; and (c) upwardly extending collecting means located on at least the lower section of the upper portion of the rear wall for receiving the snow stream from the impeller and for conducting that snow stream vertically upwardly, wherein the collecting means includes a trough means which tapers inwardly from side-to-side as it rises, and wherein the trough means at its lower end has a width which is at least approximately one-half the impeller's predetermined length.

25. An improved snowthrower as recited in claim 24, wherein the trough means is generally U-shaped.

26. An improved snowthrower as recited in claim 24, wherein the trough means is open in front along a substantial distance of the upper portion of the rear wall to further minimize clogging.

27. An improved snowthrower as recited in claim 24, further including an upwardly extending discharge chute operatively associated with the trough means, wherein the chute is rotatable relative to the housing for changing the direction of the snow stream.

28. An improved snowthrower as recited in claim 24, wherein the trough means includes a vertically extending rear wall bounded on either side by triangular side walls that progressively increase in width as the trough means rises vertically.

29. An improved snowthrower as recited in claim 28, wherein the upper ends of the rear walls and the side walls of the trough means are integrally blended into an upper collar that defines an upper edge of the trough means.

30. An improved snowthrower as recited in claim 29, wherein the upper collar is part of the housing and forms an opening which is generally circular in shape into which said trough means terminates.

31. An improved snowthrower as recited in claim 24, wherein the central snowthrowing section extends over approximately the middle seventy-five perecent of the entire impeller's predetermined length.

32. An improved snowthrower snowthrower as recited in claim 31, wherein the paddle further includes two end sections located on each side of the central section which fill out the remaining length of the paddle. and wherein each end section comprises an auger means for feeding snow inwardly onto the central section.

33. An improved snowthrower as recited in claim 32, further including downwardly directed ledges located on the upper portion of the rear wall on each side of the trough means positioned to intercept and direct downwardly any snow which is inadvertently throw upwardly by the end sections of the paddle.

34. An improved snowthrower as recited in claim 33, wherein the ledges are horizontally arranged and are located on the upper portion of the rear wall beneath a top edge of the rear wall.

35. An improved snowthrower as recited in claim 34, wherein the trough means is generally U-shaped and is open in front along a substantial distance of the upper portion of the rear wall to minimize clogging.

*36. An improved single stage snowthrower, which comprises:*

*(a) a housing which includes a generally open front portion defined by spaced side walls connected together by a rear wall;*

*(b) a rotatable snowthrowing impeller extending between the side walls and located in front of the rear wall and having a predetermined length between the side walls, wherein the impeller includes means for picking up and throwing snow upwardly along the rear wall of the housing; and*

*(c) a snow collecting chamber located on the rear wall of the housing, wherein the chamber tapers inwardly from side-to-side as it rises, and wherein the chamber at its lower end is sufficiently wide to span at least approximately fifty percent, but less than one hundred percent, of the impeller's predetermined length.*

*37. An improved single stage snowthrower, which comprises:*

*(a) a housing which includes a generally open front portion defined by spaced side walls connected together by a rear wall, wherein the open front portion includes an upper edge;*

*(b) a rotatable snowthrowing impeller extending between the side walls and located in front of the rear wall, wherein the impeller comprises a central snowthrowing section and two end sections located on each side of the central section, wherein each end section comprises auger means for feeding snow inwardly onto the central section;*

*(c) an upwardly extending snow collecting chamber located on the rear wall of the housing and having a lower end disposed beneath the upper edge of the housing; and*

*(d) two downwardly facing ledges located on the rear wall of the housing beneath the upper edge of the housing, wherein the ledges are positioned on each side of the snow collecting chamber to lie above the end sections of the impeller.*

*38. An improved single stage snowthrower as recited in claim 37, wherein the ledges are horizontally arranged.*

*39. An improved single stage snowthrower as recited in claim 37, wherein the ledges extend between the snow collecting chamber and the side walls of the housing.*

*40. An improved single stage snowthrower as recited in claim 39. wherein the ledges are horizontally arranged.*

*41. An improved single stage snowthrower as recited in claim 40, wherein the chamber tapers inwardly from side-to-side as it rises.*

*42. An improved single stage snowthrower as recited in claim 41, wherein the central snowthrowing section is curved forwardly from the midpoint to each side thereof to be generally concave in the direction of rotation of the impeller.*

*43. An improved single snowthrower of the type having a housing that includes a generally open front portion defined by spaced side walls connected together by a rear wall; a rotatable snowthrowing impeller extending between the side walls and located in front of the rear wall; and engine means carried by the housing for rotating the impeller; and wherein the improvement comprises:*

*an impeller having means for forming at least one snowthrowing paddle comprising:*

*(a) a central snowthrowing section and two end sections located on each side of the central section, wherein each end section comprises a portion of a helical auger for feeding snow inwardly onto the central section, wherein the central and end sections are made of a flexible material;*

*(b) a substantially horizontal drive shaft rotatably journalled in the side walls of the front portion of the housing;*

*(c) at least one first securing member fixed to a central portion of the drive shaft, wherein the securing member includes at least one flange extending radially outwardly from the drive shaft to which the central snowthrowing section is fastened, and wherein the flange is substantially imperforate between the drive shaft and the central snowthrowing section to define a closed face for the central snowthrowing section of the impeller; and*

*(d) a pair of second securing members with one of the second securing members received on each end of the drive shaft, wherein each of the second securing members includes at least one ear extending radially outwardly from the drive shaft to which one of the end sections of the impeller is fastened, wherein the ear is inclined at an oblique angle relative to the drive shaft to define the helical orientation of the attached end section, and wherein the ear is spaced from the drive shaft such that a gap is formed between the drive shaft and each end section of the impeller.*

*44. An improved single stage snowthrower as recited in claim 43, wherein the flange of the first securing member includes an outwardly extending ear on each side thereof located thereon to overlap the ear on one of the second securing members, and further including a fastener passing through the end section of the impeller and both of the overlapped ears.*

*45. An improved single stage snowthrower as recited in claim 43, further including a pair of first securing members for fastening the central section to the drive shaft, wherein each of the first securing members includes a semi-circular hub with the flange extending radially outwardly from the hub, wherein the securing members are secured to a central portion of the drive shaft with the hubs thereof being disposed on opposite sides of the drive shaft and the flanges being oppositely disposed relative to one another and spaced apart by a small gap into which the central snowthrowing section is received.*

* * * * *